(12) United States Patent
Fukano et al.

(10) Patent No.: US 6,354,562 B1
(45) Date of Patent: Mar. 12, 2002

(54) VALVE FOR DUST COLLECTOR

(75) Inventors: Yoshihiro Fukano, Ibaraki-ken; Masami Yoshida, Ryugasaki, both of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/662,600

(22) Filed: Sep. 14, 2000

(30) Foreign Application Priority Data

Sep. 16, 1999 (JP) ............................................ 11-262651

(51) Int. Cl.⁷ ........................... F16K 31/12; F16K 15/00
(52) U.S. Cl. ................. 251/30.03; 251/30.02; 251/331; 251/335.2
(58) Field of Search ..................... 251/30.03, 30.02, 251/30.01, 331, 335.2

(56) References Cited

U.S. PATENT DOCUMENTS

| | | | | |
|---|---|---|---|---|
| 2,121,549 A | * | 6/1938 | McNeal | |
| 3,957,244 A | * | 5/1976 | Chauvigne | 251/30 |
| 3,973,579 A | * | 8/1976 | Ollivier | 137/100 |
| 4,081,171 A | * | 3/1978 | Morgan et al. | 251/30 |
| 4,840,347 A | * | 6/1989 | Ariizumi et al. | 251/63.4 |
| 4,860,990 A | * | 8/1989 | Fukuzawa et al. | 251/30.03 |
| 5,118,072 A | * | 6/1992 | Sakamoto et al. | 251/30.02 |
| 5,520,366 A | * | 5/1996 | Elliott | 251/30.01 |
| 5,551,664 A | * | 9/1996 | Boke | 251/30.03 |
| 6,000,674 A | * | 12/1999 | Cheng | 251/26 |

* cited by examiner

Primary Examiner—Kevin Shaver
Assistant Examiner—David A Bonderer
(74) Attorney, Agent, or Firm—Paul A. Guss

(57) ABSTRACT

A valve for a dust collector comprises a bonnet and a valve body formed with a fluid port for introducing a pressure fluid filled in a pressure vessel; a diaphragm provided displaceably in accordance with an action of the pressure fluid introduced into a diaphragm chamber, for opening/closing a passage for making communication between the fluid port and a main dust collector body; and a disk member provided displaceably integrally with the diaphragm to shield the diaphragm so that it serves as a pressure-receiving surface for the pressure fluid when the pressure fluid is supplied to the main dust collector body.

9 Claims, 5 Drawing Sheets

VALVE FOR DUST COLLECTOR

BACKGROUND OF THE INVENTION

1. Field of the Invention

The present invention relates to a valve for a dust collector, which is capable of supplying a pressure fluid to a main dust collector body or which is capable of stopping the supply of the pressure fluid by opening/closing a fluid passage in accordance with a displacement action of a diaphragm.

2. Description of the Related Art

It has been hitherto known to collect the dust or the like such that a pressure fluid (air), which is supplied into a main dust collector body, is discharged from a plurality of nozzles to blow off the dust or the like trapped in the main dust collector body so that the dust or the like is allowed to fall. In this procedure, a valve for a dust collector is used, which functions to supply the pressure fluid into the main dust collector body or stop the supply of the pressure fluid.

As shown in FIG. 5, the valve for the dust collector concerning the conventional technique has a main valve body 3 which is formed with an inlet port 1 and an outlet port 2, and a diaphragm 6 which is flexibly bent in accordance with a differential pressure with respect to a diaphragm chamber 4 to open/close a passage 5 for making communication between the inlet port 1 and the outlet port 2. An unillustrated solenoid-operated valve is carried on an upper portion of the main valve body 3. An unillustrated valve plug is displaced in accordance with an exciting action of a solenoid of the solenoid-operated valve to discharge the pressure fluid in the diaphragm chamber 4 to the outside. Thus, the pressure in the diaphragm chamber 4 is adjusted.

The diaphragm 6 is held between an upper plate 7 having a large diameter and a lower plate 8 having a small diameter. The diaphragm 6 is in a state in which it is always urged downwardly by a resilient force of a spring member 9.

However, in the case of the valve for the dust collector concerning the conventional technique described above, when the diaphragm 6 is displaced upwardly to make communication between the inlet port 1 and the outlet port 2, a force is applied to tension the diaphragm 6 downwardly by the pressure fluid having a large volume supplied from the inlet port 1.

Therefore, the following inconvenience arises. That is, the tensioning force is directly applied to a portion A of the diaphragm 6 except for portions thereof which are held by the upper and lower plates 7, 8. If any excessive load, which is not less than the film thickness strength, is exerted on the portion A, the diaphragm 6 is damaged to cause any malfunction of the valve for the dust collector. Another inconvenience also arises such that the diaphragm 6 is fatigued by the use for a long period of time, and the durability of the valve for the dust collector is deteriorated.

SUMMARY OF THE INVENTION

A general object of the present invention is to provide a valve for a dust collector, which makes it possible to avoid any damage of a diaphragm for opening/closing a fluid passage and improve the durability, by mitigating the load on the diaphragm generated under the action of a flowing pressure fluid.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
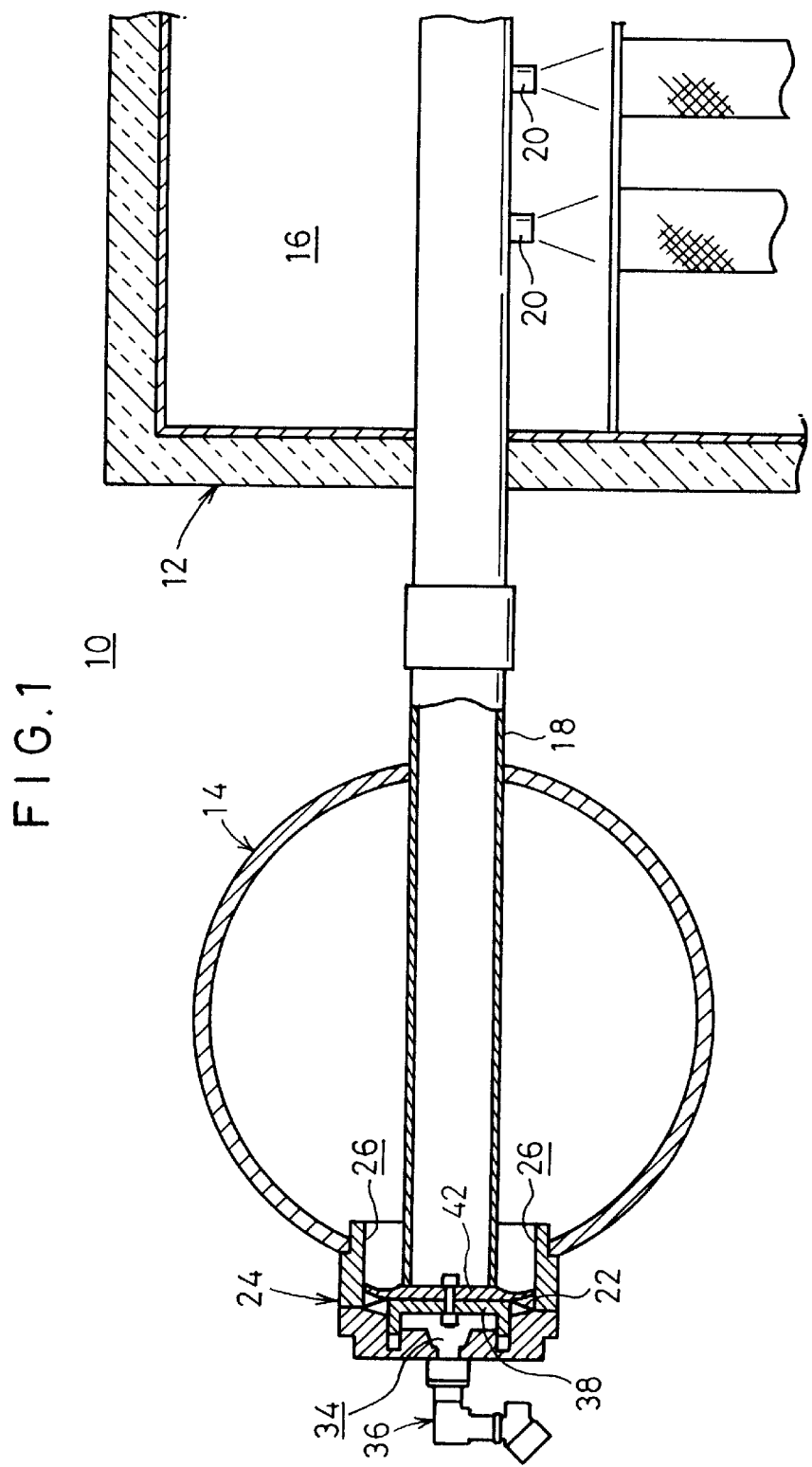
FIG. 1 shows a schematic arrangement of a dust collector into which a valve for the dust collector according to an embodiment of the present Invention is incorporated.

FIG. 1 shows a schematic arrangement of a dust collector to which a valve for the dust collector according to an embodiment of the present invention is assembled.

The dust collector 10 comprises a main dust collector body 12 made of a heat-reserving material, a tube 18 for introducing a pressure fluid from a pressure vessel 14 filled with the pressure fluid (for example, air or gas) into a chamber 16 of the main dust collector body 12, a plurality of nozzles 20 connected to the tube 18 for discharging the pressure fluid toward the dust or the like trapped in the main dust collector body 12, and the valve 24 for the dust collector for supplying the pressure fluid to the main dust collector body 12 or stopping the supply of the pressure fluid by opening/closing an opening disposed at a first end of the tube 18 by using a diaphragm 22.

Figure 2:
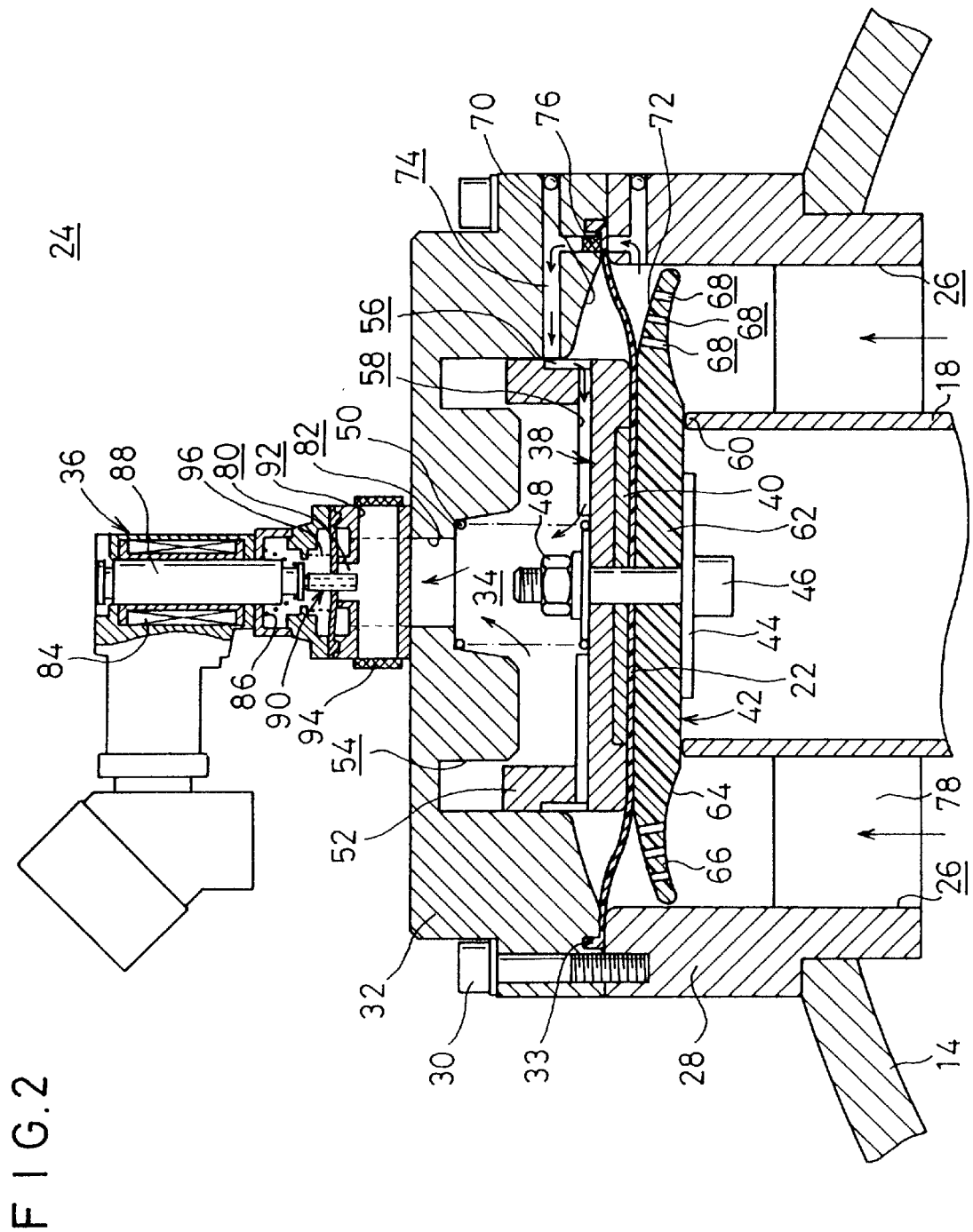
FIG. 2 shows a longitudinal sectional view taken along an axial direction of the valve for the dust collector according to the embodiment of the present invention.

As shown in FIG. 2, the valve 24 for the dust collector includes a valve body 28 which is installed to the pressure vessel 14 in an air-tight manner and which is formed with a fluid port 26 for introducing the pressure fluid from the pressure vessel 14, a bonnet 32 which is integrally connected to the valve body 28 by means of bolts 30, the diaphragm 22 which is interposed at its circumferential edge portion 33 between the valve body 28 and the bonnet 32, and a solenoid-operated valve 36 which is connected to an upper portion of the bonnet 32 for adjusting the pressure of a diaphragm chamber 34 closed by the diaphragm 22 and the bonnet 32. The valve body 28 and the bonnet 32 function as a main valve body section.

A guide ring 38 and a first diaphragm holder 40 are stacked on the upper side of the diaphragm 22. A disk member 42 and a second diaphragm holder 44 are provided and stacked on the lower side of the diaphragm 22. In this arrangement, the guide ring 38, the first diaphragm holder 40, the disk member 42, and the second diaphragm holder 44 are integrally joined to the diaphragm 22 by means of a bolt 46 penetrating through the central portion and a nut 48 fastened to the bolt 46. The guide ring 38, the first diaphragm holder 40, the disk member 42, and the second diaphragm holder 44 are in a state in which they are always pressed downwardly by means of the resilient force of a spring member 50 arranged in the diaphragm chamber 34.

An annular projection (guide member) 52, which expands upwardly, is formed at the circumferential edge of the guide ring 38. The annular projection 52 is displaceable along an annular recess 54 formed in the bonnet 32, and thus it effects the guide function to avoid any positional discrepancy which would be otherwise caused when the diaphragm 22 and the disk member 42 are displaced. An annular groove 56 is formed at an outer circumferential portion of the guide ring 38. The annular groove 56 is provided to make communication with the diaphragm chamber 34 via a communication passage 58 which extends in the radial direction.

The disk member 42 is formed to have a substantially disk-shaped configuration, and it comprises a thick-walled section 62 to be seated on the first end 60 of the tube 18 as a seat section, and a thin-walled section 66 formed with a curved surface 64 for smoothing the flow of the pressure fluid. The disk member 42 functions to support and protect the diaphragm 22. A plurality of small holes 68 are formed through the thin-walled section 66 to penetrate therethrough from the upper side to the lower side. When the pressure fluid passes through the small holes 68, the dust or the like contained in the pressure fluid is removed. It is preferable that the disk member 42 is made of a synthetic resin material. It is also allowable to use a disk member (not shown) which is not formed with the plurality of small holes 68.

The diameter on the outer circumferential side of the disk member 42 is designed such that a predetermined clearance is formed between the disk member 42 and the inner wall surface of the valve body 28. An inclined surface 72, which corresponds to a cross-sectional configuration of an inner wall surface 70 of the bonnet 32, is formed on the upper surface of the thin-walled section 66 of the disk member 42. When the disk member 42 is moved upwardly, the diaphragm 22 is held without generating any gap between the diaphragm 22 and the inner wall surface 70 of the bonnet 32 and the inclined surface 72 of the thin-walled section 66.

A passage 74, which makes communication between the fluid port 26 and the annular groove 56 of the guide ring 38, is formed in the valve body 28 and the bonnet 32. A filter 76 is arranged at an intermediate position of the passage 74. Therefore, when the disk member 42 is seated on the first end 60 of the tube 18 to close the opening (state shown in FIG. 2), then the pressure fluid, which is introduced from the fluid port 26, passes through the plurality of small holes 68 of the disk member 42 and through the clearance between the disk member 42 and the inner wall surface of the valve body 28, and it is supplied to the diaphragm chamber 34 via the passage 74, the annular groove 56, and the communication passage 58. A rib 78 is formed at a portion disposed closely to the fluid port 26 of the valve body 28 in order to ensure the rigidity. A hole 82 for making communication between the diaphragm chamber 34 and a valve chamber 80 of the solenoid-operated valve 36 is formed at an upper portion of the bonnet 32.

Figure 3:
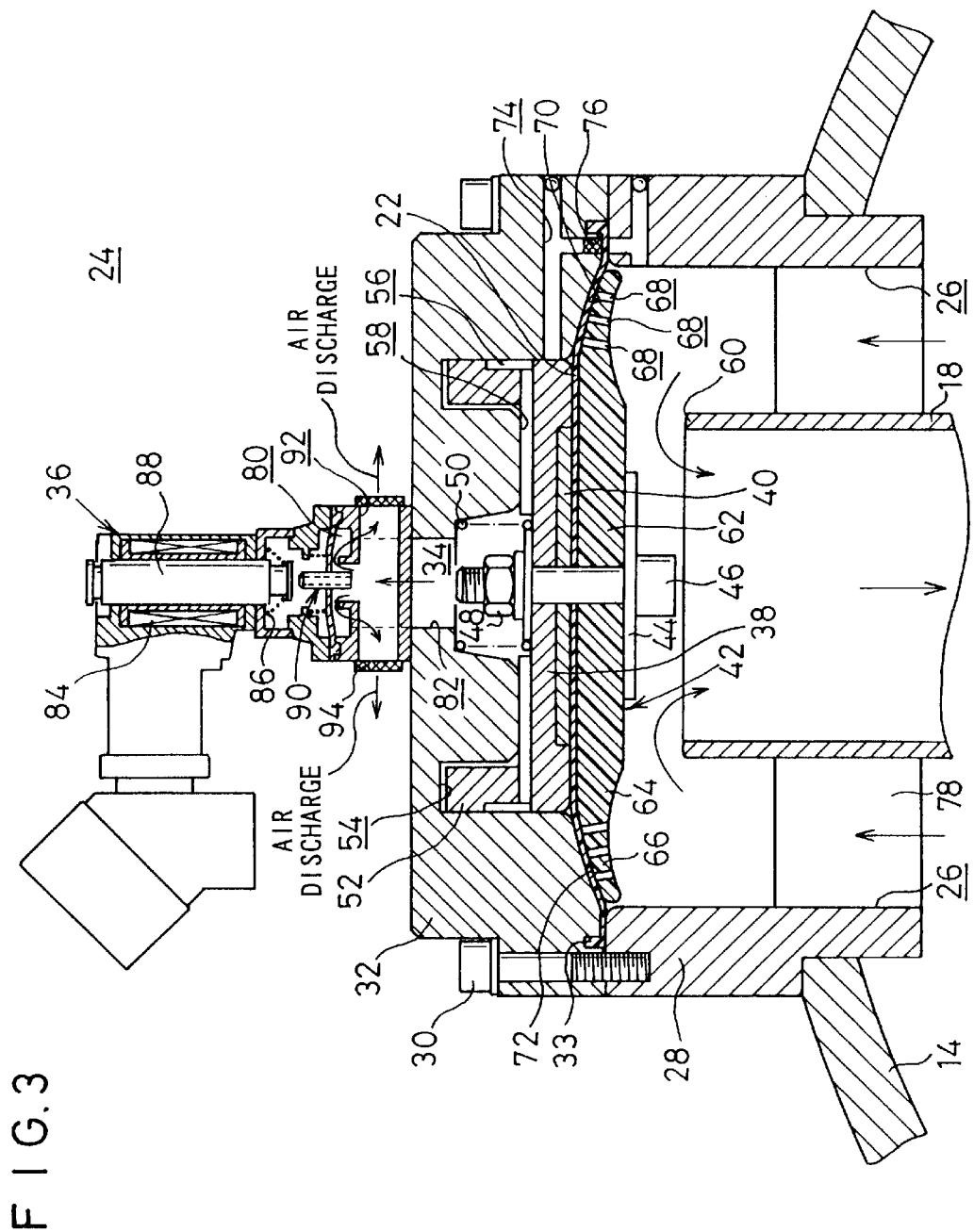
FIG. 3 shows a longitudinal sectional view illustrating a state In which a diaphragm Is moved upwardly starting from an initial state shown in FIG. 2, and a pressure fluid is supplied to the side of a main dust collector body.

The solenoid-operated valve 36 includes a solenoid section 84, a displacement member 88 for making displacement against a resilient force of a first spring member 86 in accordance with an exciting action of the solenoid section 84, a valve plug 90 for making engagement with a first end of the displacement member 88 to open/close the valve chamber 80, and a discharge port 92 for discharging the pressure fluid in the diaphragm chamber 34 to the outside when the valve plug 90 is separated from a seat section to give the valve-open state (see FIG. 3). A filter 94 is installed to the discharge port 92. Reference numeral 96 indicates a second spring member for restoring the valve plug 90 to the seat section.

The valve 24 for the dust collector according to the embodiment of the present invention is basically constructed as described above. Next, its operation, function, and effect will be explained.

At first, explanation will be made for the initial state in which the supply of the pressure fluid to the main dust collector body 12 is stopped.

The pressure fluid, which is filled in the pressure vessel 14, passes through the plurality of small holes 68 of the disk member 42 and through the clearance between the disk member 42 and the inner wall surface of the valve body 28. Further, the pressure fluid is supplied to the diaphragm chamber 34 via the passage 74, the annular groove 56, and the communication passage 58. In this situation, the valve-closed state is given, in which the solenoid-operated valve 36 is in the non-excited state, and the valve plug 90 is seated on the seat section. Accordingly, the diaphragm chamber 34 is closed. Therefore, the force to press the diaphragm 22 downwardly is generated in accordance with the action of the pressure fluid introduced into the diaphragm chamber 34. The disk member 42 is seated on the first end 60 of the tube 18, and thus the first end 60 of the tube 18 is closed (see FIG. 2). As a result, the initial state is given, in which the supply of the pressure fluid filled in the pressure vessel 14 into the main dust collector body 12 is stopped.

Subsequently, in the initial state as described above, when an ON signal is introduced from an unillustrated controller into the solenoid-operated valve 36, the displacement member 88 is moved upwardly against the resilient force of the first spring member 86 in accordance with the exciting action of the solenoid section 84. Further, the valve plug 90 is moved upwardly, and it is separated from the seat section to give the valve-open state. Therefore, the pressure fluid in the diaphragm chamber 34 is discharged to the outside via the valve chamber 80 and the discharge port 92. The pressure in the diaphragm chamber 34 is decreased. Accordingly, the guide ring 38, the first diaphragm holder 40, the diaphragm 22, the disk member 42, and the second diaphragm holder 44 are moved upwardly in an integrated manner. The disk member 42 is separated from the first end 60 of the tube 18, and thus the clearance is formed (see FIG. 3).

As a result, the pressure fluid, which is filled in the pressure vessel 14, flows along the tube 18 via the clearance between the disk member 42 and the first end 60 of the tube 18. The pressure fluid, which is supplied to the inside of the chamber 16 of the main dust collector body 12, is discharged toward the dust or the like from the plurality of nozzles 20.

In the embodiment of the present invention, when the pressure fluid in the pressure vessel 14 is supplied to the main dust collector body 12 via the tube 18, the diaphragm 22 and the disk member 42 are moved upwardly in the integrated manner. The substantially entire bottom surface of the diaphragm 22 is shielded by the disk member 42. Accordingly, the disk member 42 serves as a pressure-receiving surface for the pressure fluid flowing from the fluid port 26 to the first end 60 of the tube 18. Therefore, the tensioning force, which is applied by the pressure fluid, is shut off by the disk member 42. Thus, the tensioning force is not applied to the diaphragm 22.

In other words, as shown in FIG. 3, when the disk member 42 is moved upwardly, the diaphragm 22 is held without generating any gap between the diaphragm 22 and the inner wall surface 70 of the bonnet 32 and the inclined surface 72 of the disk member 42. Accordingly, the pressure fluid does not act on the diaphragm 22 directly. Therefore, the damage of the diaphragm 22 is avoided, which would be otherwise caused by the action of the flowing pressure fluid. Thus, it is possible to improve the durability.

In the embodiment of the present invention, the pressure fluid passes through the plurality of small holes 68 formed through the disk member 42 to remove the dust or the like contained in the pressure fluid filled in the pressure vessel 14. Accordingly, it is possible to avoid the invasion of the dust or the like into the clearance between the outer circumferential edge portion of the disk member 42 and the inner wall surface of the valve body 28.

Figure 4:
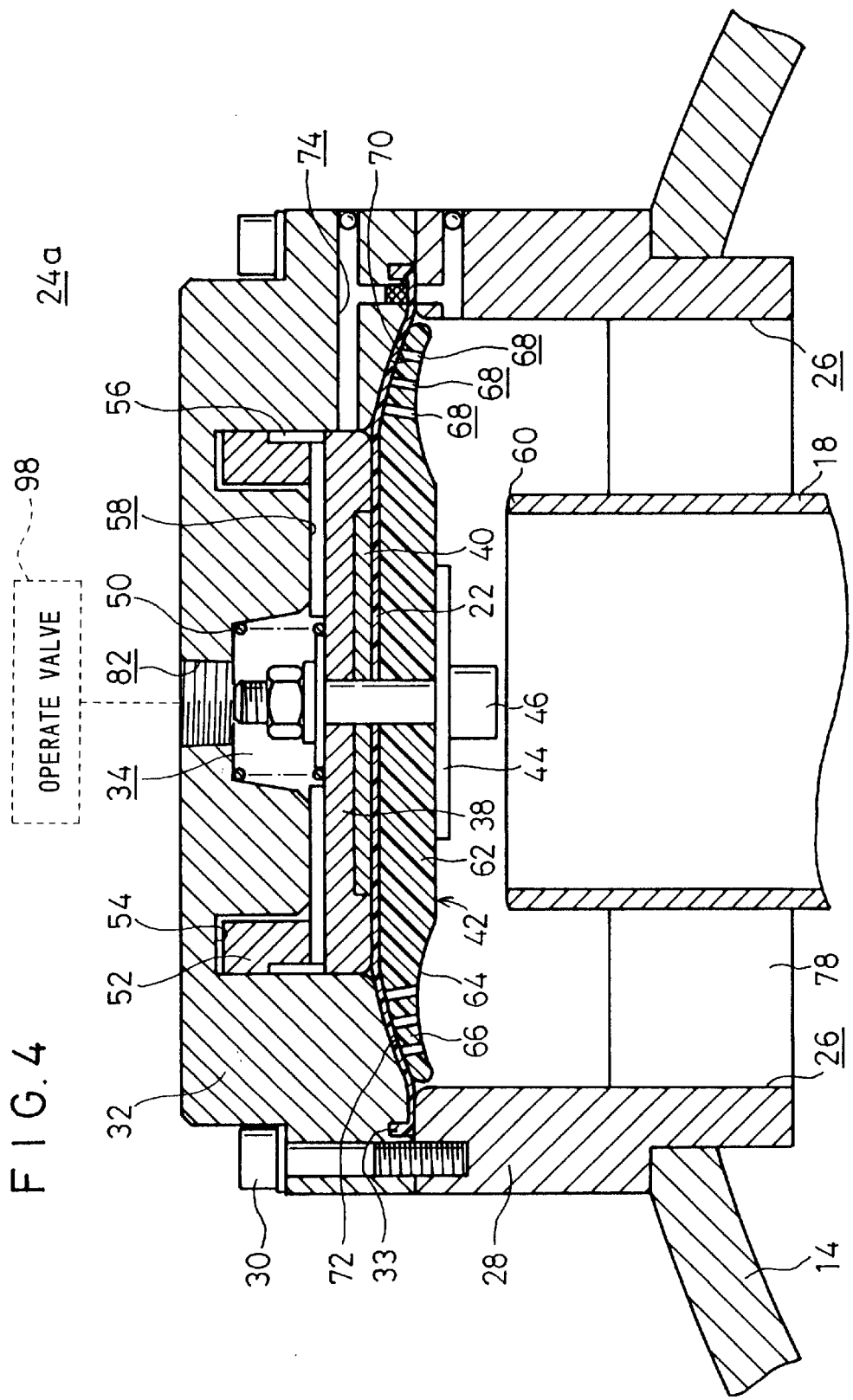
FIG. 4 shows a longitudinal sectional view taken along an axial direction of a valve for a dust collector according to another embodiment of the present invention.
Figure 5:
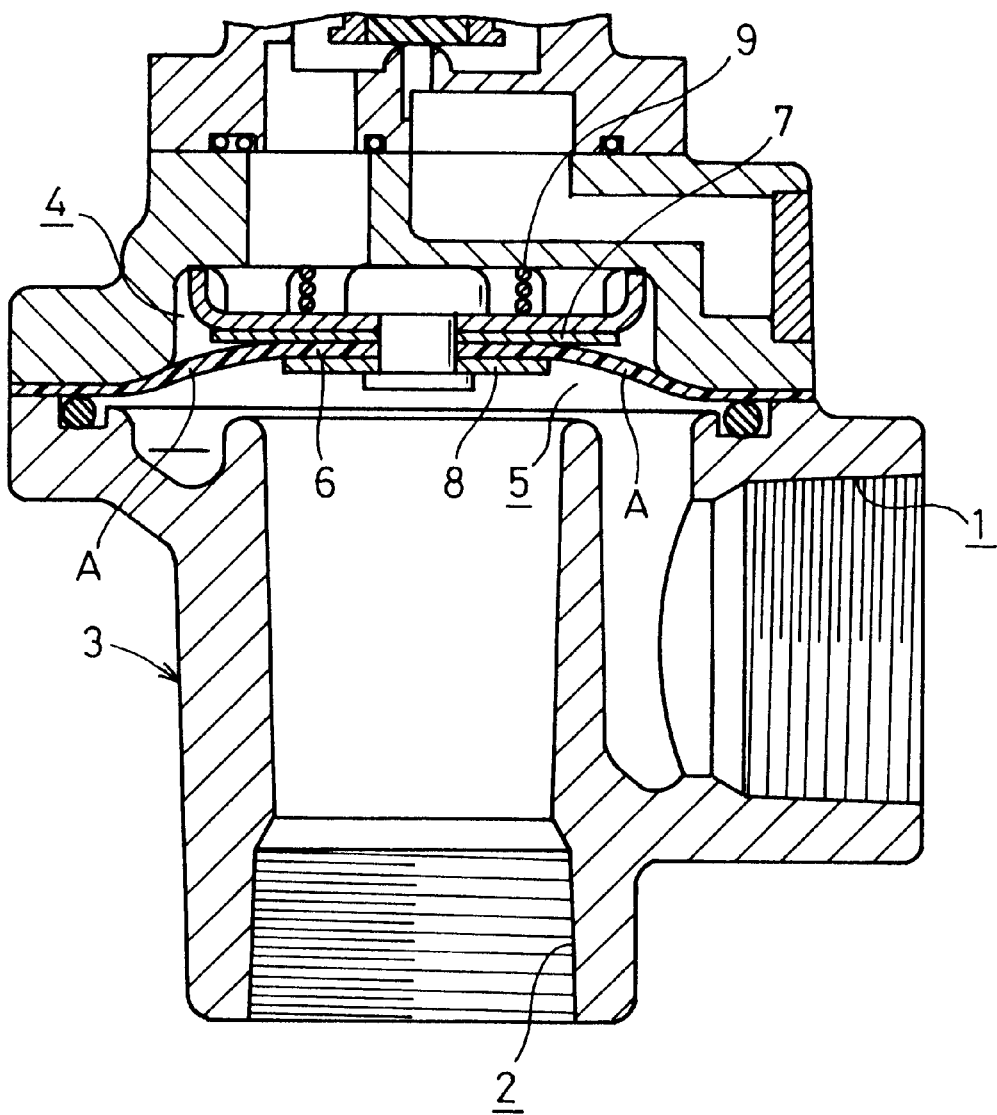
FIG. 5 shows, with partial omission, a longitudinal sectional view illustrating a valve for a dust collector concerning the conventional technique.

The embodiment of the present invention has been explained by using the valve of the type in which the solenoid-operated valve is carried on the bonnet 32. However, there is no limitation thereto. As shown in FIG. 4, it is also preferable to use a valve 24*a* for the dust collector of the air-operated type provided with no solenoid-operated valve 36. The use of the valve 24*a* for the dust collector of the air-operated type is advantageous in that it is possible to remote-control the pressure in the diaphragm chamber 34 by using an operate valve 98.

What is claimed is:

1. A valve for a dust collector, for supplying a pressure fluid accommodated in a pressure vessel into a main dust collector body or stopping supply of said pressure fluid, said valve for said dust collector comprising:

a main valve body section which is formed with a fluid port for introducing said pressure fluid from said pressure vessel;

a diaphragm which is displaceable in accordance with an action of said pressure fluid introduced into a diaphragm chamber, for opening/closing a passage for making communication between said fluid port and said main dust collector body; and a disk member which is provided displaceably integrally with said diaphragm and which shields a flexible portion of said diaphragm to serve as a pressure-receiving surface for said pressure fluid when said pressure fluid is supplied to said main dust collector body, wherein at-least one hole is formed in said disk member which penetrates from one surface to another surface of said disk member and allows said pressure fluid to pass through said disk member.

2. The valve for said dust collector according to claim 1, wherein said disk member is formed to have a substantially disk-shaped configuration, and it comprises a thick-walled section for being seated on a first end of a tube to serve as a seat section, and a thin-walled section formed integrally with said thick-walled section.

3. The valve for said dust collector according to claim 1, wherein a plurality of small holes, which penetrate from one surface to the other surface, are formed through said disk member.

4. The valve for said dust collector according to claim 2, wherein a plurality of small holes, which penetrate from one surface to the other surface, are formed through said thin-walled section disposed on an outer circumferential side of said disk member.

5. The valve for said dust collector according to claim 2, wherein a curved surface for guiding a flow of said pressure fluid is formed on said pressure-receiving surface of said thin-walled section.

6. The valve for said dust collector according to claim 1, wherein said disk member is made of a synthetic resin material.

7. The valve for said dust collector according to claim 1, wherein a guide member, which makes guidance so as not to cause any positional discrepancy when said diaphragm and said disk member are integrally displaced, is provided in said main valve body section.

8. The valve for said dust collector according to claim 1, wherein a pressure of said diaphragm chamber is adjusted by a solenoid-operated valve carried on said main valve body section.

9. The valve for said dust collector according to claim 1, wherein a pressure of said diaphragm chamber is adjusted by an operate valve separated from said main valve body section.

* * * * *